(12) United States Patent
Richardson

(10) Patent No.: US 8,094,215 B2
(45) Date of Patent: Jan. 10, 2012

(54) DIGITAL COLUMN GAIN MISMATCH CORRECTION FOR 4T CMOS IMAGING SYSTEMS-ON-CHIP

(75) Inventor: John David Richardson, Calabasas, CA (US)

(73) Assignee: AltaSens, Inc., Westlake Village, CA (US)

( * ) Notice: Subject to any disclaimer, the term of this patent is extended or adjusted under 35 U.S.C. 154(b) by 581 days.

(21) Appl. No.: 12/244,047

(22) Filed: Oct. 2, 2008

(65) Prior Publication Data

US 2010/0085438 A1    Apr. 8, 2010

(51) Int. Cl.
*H04N 5/217* (2011.01)
*H04N 9/64* (2006.01)
*H04N 5/228* (2006.01)
*H04N 17/00* (2006.01)
*H04N 17/02* (2006.01)

(52) U.S. Cl. ............... 348/241; 348/243; 348/222.181; 348/187

(58) Field of Classification Search ............ 348/222.1, 348/181, 187, 189, 192, 184, 188, 246, 247, 348/241, 243; 356/4.01, 4.02, 3.07
See application file for complete search history.

(56) References Cited

U.S. PATENT DOCUMENTS

| | | | | |
|---|---|---|---|---|
| 6,614,560 B1 * | 9/2003 | Silverbrook | ............... | 358/443 |
| 6,903,670 B1 * | 6/2005 | Lee et al. | ............... | 341/118 |
| 7,015,960 B2 * | 3/2006 | Tay | ............... | 348/244 |
| 7,046,284 B2 * | 5/2006 | Kozlowski et al. | ............... | 348/308 |
| 7,813,586 B2 * | 10/2010 | Gutkowicz-Krusin et al. | ............... | 382/275 |
| 7,876,371 B2 * | 1/2011 | Otaka | ............... | 348/294 |
| 2004/0189836 A1 * | 9/2004 | Spears et al. | ............... | 348/241 |
| 2006/0262210 A1 * | 11/2006 | Smith et al. | ............... | 348/308 |
| 2006/0290552 A1 * | 12/2006 | Roh et al. | ............... | 341/155 |
| 2007/0019085 A1 * | 1/2007 | Suzuki | ............... | 348/241 |
| 2007/0138375 A1 * | 6/2007 | Lee et al. | ............... | 250/214 R |
| 2008/0055432 A1 * | 3/2008 | Koseki | ............... | 348/241 |
| 2008/0197268 A1 * | 8/2008 | Kameda | ............... | 250/208.1 |

* cited by examiner

*Primary Examiner* — Jason Chan
*Assistant Examiner* — Stephen Coleman
(74) *Attorney, Agent, or Firm* — Turocy & Watson, LLP

(57) ABSTRACT

Systems and methods are provided that facilitate mitigating column gain mismatch in a CMOS imaging System-on-Chip (iSoC) sensor. Tunable voltages that mimic presence of photo-charge can be provided to test pixels in one or more rows of a pixel array. Moreover, column-specific digital gain corrections can be calibrated based upon input data received from the test pixels. During calibration, actual data can be compared to a target expected to be obtained via an analog readout architecture. The calibrated, column-specific digital gain corrections can be utilized to correct for column gain mismatch to yield output data. Further, correction values corresponding to the column-specific digital gain corrections can be retained in and retrieved from memory. The correction values, for example, can be a function of a scaling parameter that is tuned to match an available memory dynamic to a range of uncorrected gain mismatch.

20 Claims, 11 Drawing Sheets

DIGITAL COLUMN GAIN MISMATCH CORRECTION FOR 4T CMOS IMAGING SYSTEMS-ON-CHIP

BACKGROUND

Recent technological advances have led to complementary metal-oxide-semiconductor (CMOS) sensor imagers being leveraged by cameras, video systems, and the like. CMOS sensor imagers can include an integrated circuit with an array of pixel sensors, each of which can comprise a photodetector. Moreover, a CMOS sensor imager can be incorporated into a System-on-Chip (SoC). As such, the SoC can integrate various components (e.g., analog, digital, ...) associated with imaging into a common integrated circuit. For instance, the SoC can include a microprocessor, microcontroller, or digital signal processor (DSP) core, memory, analog interfaces (e.g., analog to digital converters, digital to analog converters), and so forth.

Visible imaging systems implemented using CMOS imaging sensors can reduce costs, power consumption, and noise while improving resolution. For instance, cameras can use CMOS imaging System-on-Chip (iSoC) sensors that efficiently marry low-noise image detection and signal processing with multiple supporting blocks that can provide timing control, clock drivers, reference voltages, analog to digital conversion, digital to analog conversion and key signal processing elements. High-performance video cameras can thereby be assembled using a single CMOS integrated circuit supported by few components including a lens and a battery, for instance. Accordingly, by leveraging iSoC sensors, camera size can be decreased and battery life can be increased. Also, dual-use cameras have emerged that can employ iSoC sensors to alternately produce high-resolution still images or high definition (HD) video.

A CMOS imaging sensor can include an array of pixel cells, where each pixel cell in the array can include a photodetector (e.g., photogate, photoconductor, photodiode, ...) that overlays a substrate for yielding a photo-generated charge. A readout circuit can be provided for each pixel cell and can include at least a source follower transistor. The pixel cell can also include a floating diffusion region connected to a gate of the source follower transistor. Accordingly, charge generated by the photodetector can be sent to the floating diffusion region. Further, the imaging sensor can include a transistor for transferring charge from the photodetector to the floating diffusion region and another transistor for resetting the floating diffusion region to a predetermined charge level prior to charge transference.

CMOS imaging Systems-on-Chip (iSoC) are prone to revealing artifacts within an image resultant from the analog readout architecture. For instance, at each analog buffer stage, a finite offset and gain deviation can be introduced. The offset deviations can result in coherent fixed pattern noise (FPN) elements such as column FPN. Depending on an amplitude of light, column FPN can be visible in an output generated under low-light conditions when high gain is applied. Conventional techniques oftentimes employ rudimentary digital corrections to align offsets (e.g., between columns, ...) when matching in the analog domain cannot be made sufficiently tight. However, these common approaches typically fail to account for column-wise gain variations that degrade flat field image quality (e.g., in the presence of large photon fluxes, ...).

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate mitigating column gain mismatch in a CMOS imaging System-on-Chip (iSoC) sensor. Tunable voltages that mimic presence of photo-charge can be provided to test pixels in one or more rows of a pixel array. Moreover, column-specific digital gain corrections can be calibrated based upon input data received from the test pixels. During calibration, actual data can be compared to a target expected to be obtained via an analog readout architecture. The calibrated, column-specific digital gain corrections can be utilized to correct for column gain mismatch to yield output data. Further, correction values corresponding to the column-specific digital gain corrections can be retained in and retrieved from memory. The correction values, for example, can be a function of a scaling parameter that is tuned to match an available memory dynamic to a range of uncorrected gain mismatch.

According to various aspects, a digital input corresponding to analog data obtained by a pixel of a pixel array of a CMOS sensor imager can be received. For instance, the digital input can be recognized as being obtained by a test pixel or a non-test pixel. Moreover, a black reference level can be removed from the digital input to yield a photo-signal. Further, a column-specific digital gain correction can be applied to the photo-signal to generate a corrected photo-signal. Additionally, the black reference level can be reinserted with the corrected photo-signal to yield a digital output. When the digital input is identified as originating from a test pixel, calibration of the column-specific digital gain correction can also be effectuated. For instance, the column-specific digital gain correction can be calibrated by comparing the digital output to a target. Additionally or alternatively, the column-specific digital gain correction can be calibrated as a function of the scaling parameter, the target, and the photo-signal.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
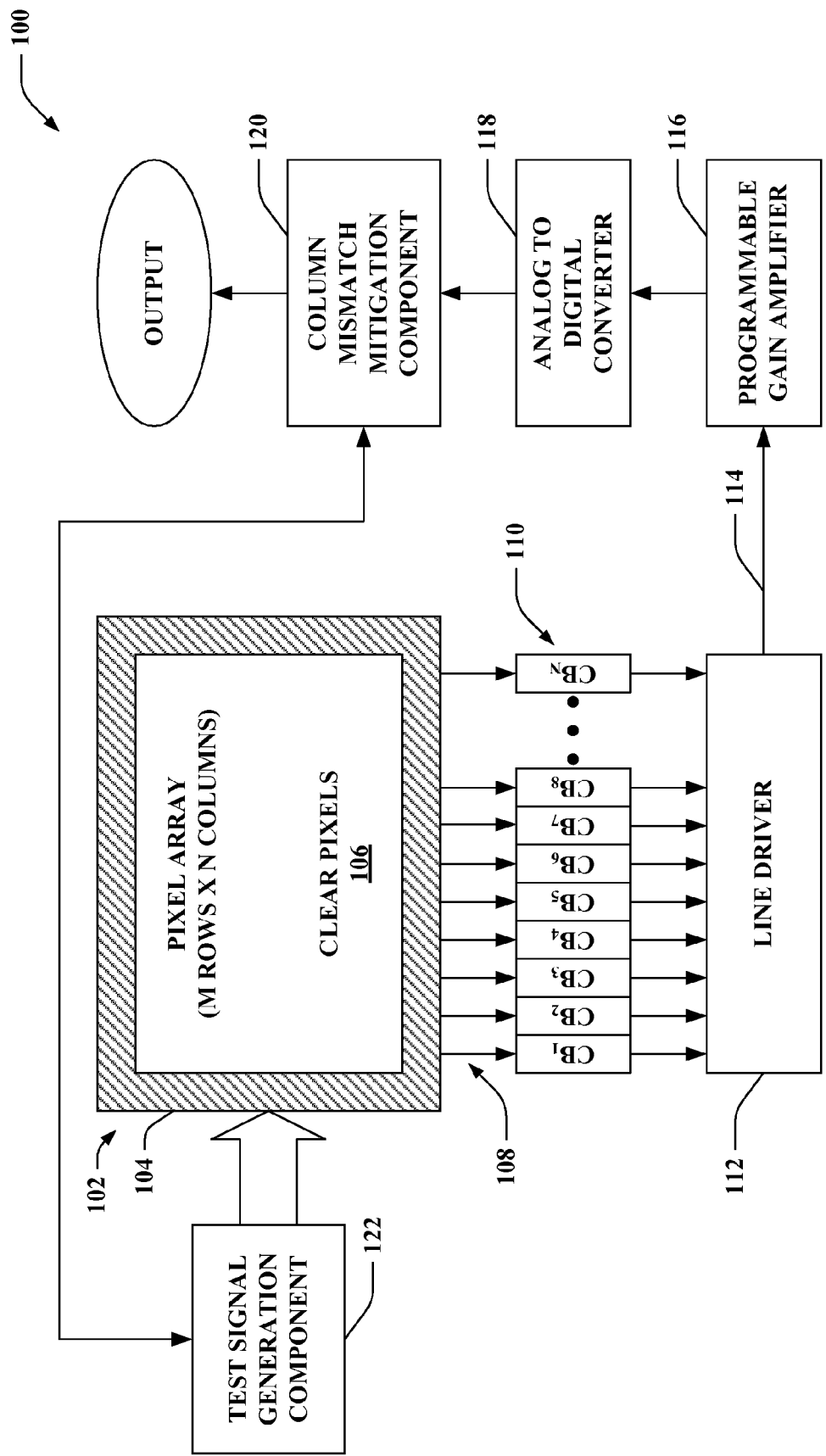
FIG. 1 illustrates a block diagram of an example system that employs digital column gain mismatch correction.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

With reference to FIG. 1, illustrated is a system 100 that employs digital column gain mismatch correction. The system 100 can be associated with a CMOS sensor imager utilized in connection with a camcorder, digital camera, microscope, video system, and/or the like. The system 100 comprises a pixel array 102 that can include M rows and N columns of pixel cells, where M and N can be any integers.

Each pixel in the pixel array 102 can comprise a photodetector (e.g., photogate, photoconductor, photodiode, . . . ). Further, each pixel in the pixel array 102 can be utilized to detect a particular color of light; thus, a subset of the pixels in the pixel array 102 can operate in response to red light (R pixels), a disparate subset of the pixels can operate based upon blue light (B pixels) and a further subset of the pixels can operate as a function of green light (G pixels). It is to be appreciated, however, that the claimed subject matter is not so limited.

The pixel array 102 can include a portion 104 covered by metal, which shields pixels included in the portion 104 of the pixel array 102 from light. The metal covered portion 104 can include optical black pixels that are inhibited from being exposed to light. Any number of rows (out of the M rows) and/or columns (out of the N columns) can be included in the metal covered portion 104 of the pixel array 102. The pixel array 102 can additionally include a clear pixel portion 106. Pixels in the clear pixel portion 106 can be exposed to light. It is to be appreciated that any number of rows and/or columns can be included in the clear pixel portion 106. Moreover, the metal covered portion 104 can, but need not, be symmetrically located upon the pixel array 102 with respect to the clear pixel portion 106; for instance, a first number of rows can be covered by metal at a top of the pixel array 102 and a second number of rows can be covered by metal at a bottom of the pixel array 102 such that the first and second numbers can be the same or different. According to an example, a number of rows (e.g., 64 rows, 128 rows, . . . ) of pixels at the top of the pixel array 102 can be optically black; however, the claimed subject matter is not so limited.

An image focused on the pixel array 102 (e.g., the clear pixel portion 106) can cause the pixels to convert incident light into electrical energy. Signals obtained by the pixel array 102 can be processed on a column by column basis; thus, a particular row of pixels from the pixel array 102 can be selected to be read. During a readout cycle, each pixel can provide two voltages, and the difference between these two voltages can be measured. The system 100 can further include a plurality of read buses 108 that can transfer the contents from the pixels in the pixel array 102 in the selected row. According to an illustration, the system 100 can include N read buses 108, where each read bus 108 can be associated with a respective column of the pixel array 102. By way of further example, pixels in the pixel array 102 can share read buses 108, and thus, the system 100 can include fewer than N read buses 108.

Each read bus 108 can carry content (e.g., sampled signals) from the pixels to a respective column buffer (CB) 110. The system 100 can include N column buffers 110 or fewer, for instance. The column buffers 110 can amplify (e.g., condition) the signals from the pixels. Further, each column buffer 110 can enable low noise readout and can condition the signal from a pixel positioned at one of the rows in the column (or columns) corresponding to the column buffer 110.

After processing by the column buffers 110, output from the column buffers 110 can be multiplexed into a common readout path by a line driver 112. The line driver 112 can be a source follower, for instance. Moreover, although not shown, it is to be appreciated that the system 100 can include more than one line driver, each substantially similar to the line driver 112, for sending outputs from the column buffers 110 via a common readout path. The output from the line driver 112 can be transferred over a common bus 114 (e.g., voltages generated by the column buffers 110 can be multiplexed over the common bus 114, . . . ). The common bus 114 can enable communicating each of the outputted values from the respective column buffers 110 to a programmable gain amplifier (PGA) 116. For instance, the programmable gain amplifier 116 can amplify output from each of the column buffers 110 one at a time. The amplified output generated by the programmable gain amplifier 116 can thereafter be provided to an analog to digital converter (ADC) 118. The ADC 118 can digitize the output from the programmable gain amplifier 116 to yield a digital signal. According to another illustration, a plurality (e.g., two, four, . . . ) of ADCs, each substantially similar to the ADC 118, can be included per chip; however, the claimed subject matter is not so limited. The digital signal yielded by the ADC 118 can thereafter be provided to a column mismatch mitigation component 120 that corrects column gain mismatch in the digital signal to yield an output. The column mismatch mitigation component 120 can additionally or alternatively reduce offset deviations between columns in the generated output. Moreover, the output from the column mismatch mitigation component 120 can be provided to various component(s) (not shown) for further processing, manipulation, storage, and so forth.

Finite offset and gain deviation can be introduced at analog stages of the system 100 (e.g., the pixel array 102, the column buffers 110, the line driver 112, the programmable gain amplifier 116, and/or the ADC 118 can introduce offset and/or gain deviation, . . . ). The column mismatch mitigation component 120 can compensate for column-to-column fixed offset variation, where columns can be offset from one another. Column-to-column fixed offset variation can be a systematic offset that yields vertical stripes in an image if left uncompensated. The fixed offset variation between columns can be referred to as column fixed pattern noise (FPN). In contrast to conventional techniques that implement rudimentary image correction to mitigate column-wise offset while failing to correct for gain-wise variations, the column mismatch mitigation component 120 can also correct for gain-to-gain mismatch. Gain-to-gain mismatch can be yielded by the column buffers 110. Thus, the column mismatch mitigation component 120 can compensate for differences in gains, each associated with respective column buffers 110, by aligning column-wise gain variations that degrade flat field image quality. Gain mismatch, for example, can be particularly perceptible in an image if uncorrected in the presence of large photon fluxes.

The column mismatch mitigation component 120 can utilize the optical black pixels in the metal covered portion 104 of the pixel array 102 to calibrate for fixed pattern noise correction. The optical black pixels in the metal covered portion 104 of the pixel array 102 can be employed for calibration by providing references from which noise levels can be deduced. By way of illustration, a row of optical black pixels in the metal covered portion 104 can be selected to be read. Since this row of optical black pixels fail to receive light, signals yielded by each of these pixels lack correlation to incident light upon the pixel array 102 (e.g., zero input is provided to the optical black pixels). The signals generated by the optical black pixels can be processed in a similar manner as compared to pixels from the clear pixel portion 106 of the pixel array 102 (e.g., pixels in the same column can be read through the same column buffer 110, . . . ). Since zero input is provided to the optical black pixels, a predetermined output (e.g., a black reference level, . . . ) can be expected to be yielded upon processing; however, noise can be included in the outputted signals. Accordingly, calibration can be effectuated by the column mismatch mitigation component 120 to determine the noise associated with each column, which can be referred to as the column fixed pattern noise. Noise values associated with each column of the pixel array 102 can be determined during calibration; for instance, digital signals corresponding to the row of optical black pixels can be retained in a line of memory, where each of the digital signals can correlate to noise of a particular column. Thereafter, the set of noise values from the line of memory can be utilized by the column mismatch mitigation component 120 during a correction phase to mitigate column fixed pattern noise within the outputted digital signal (e.g., subtract a noise value associated with a particular column from a signal value of a clear pixel from the particular column). It is contemplated that digital signals from any number of rows of optical black pixels can be combined in any manner. For example, various calibration algorithms can be utilized by the system 100 (e.g., determining average, median, mode, etc. of digital signals from optical black pixels in each column over time, aging out older values of digital signals from optical black pixels, . . . ).

Moreover, to reduce gain variation, the column mismatch mitigation component 120 can utilize one or more test rows (not shown) within the pixel array 102 and a test signal generation component 122 that can provide voltages to the pixels in the one or more test rows. The voltages can be yielded by the test signal generation component 122 and directly applied to the pixels in the one or more test rows to mimic presence of photo-charge. Moreover, the voltages provided from the test signal generation component 122 can be tunable. By utilizing the test signal generation component 122, a known voltage can be provided as an input to each of the pixels in one or more test rows, and a corresponding output (e.g., target, digital signal obtained at the column mismatch mitigation component 120, . . . ) can be expected to be yielded in response. Further, the column mismatch mitigation component 120 can compare an actual output to the expected output, and determine correction multipliers (e.g., digital gain corrections, correction values, . . . ) for each of the columns based upon the comparison. The correction multipliers can thereafter be retained in memory (not shown). The column mismatch mitigation component 120 can also retrieve the correction multipliers from memory to correct for the gain mismatch between columns included in digital signals yielded from non-test pixels.

According to another example, it is contemplated that test pixels need not all be in a common row (or rows). Thus, following this example, at least one special-purpose pixel (e.g., test pixel, . . . ) can be provided per column of the pixel array 102, and these test pixels can each be positioned in substantially any row of the pixel array 102. For instance, a row in which a first test pixel is located can be the same or can differ from a row in which a second test pixel is positioned. By way of another illustration, a row can include at least one test pixel and at least one non-test pixel, only test pixels, or only non-test pixels. It is to be appreciated, however, that the claimed subject matter is not limited to the aforementioned examples.

The correction multipliers retained in memory can thereafter be utilized by the column mismatch mitigation component 120 to correct the remainder of digital signals yielded by the ADC 118 captured by the remainder of the pixels (e.g., non-test pixels, . . . ) from the pixel array 102. Thus, the column mismatch mitigation component 120 can differentiate between digital signals corresponding to test pixels and non-test pixels. Further, the column mismatch mitigation component 120 can utilize the test pixels to calibrate correction multipliers corresponding to respective columns of the pixel array 102 (e.g., respective column buffers 110, . . . ), while the calibrated correction multipliers can be employed to adjust digital signals yielded from the non-test pixels. Moreover, the adjusted digital signals can be provided as the output.

According to an example, the column mismatch mitigation component 120 can control the test signal generation component 122. Following this example, the column mismatch mitigation component 120 can select voltage level(s) to be yielded by the test signal generation component 122 (e.g., and/or the corresponding target expected to be obtained via the readout architecture at the column mismatch mitigation component 120, . . . ), whether tuned voltage(s) are provided to the test pixels by the test signal generation component 122 during every frame or a subset of frames (e.g., which frames are utilized for gain mismatch recalculation, . . . ), and so forth. By way of another illustration, the aforementioned operating parameters can be independently managed by the test signal generation component 122 and reported to the column mismatch mitigation component 120. Moreover, although depicted as being separate, it is to be appreciated that the column mismatch mitigation component 120 can alternatively include at least a portion of the test signal generation component 122.

In general, whether a viewer is able to perceive coherent spatial or temporal noise can depend on the contrast ratio to the random pixel noise. The ideal low-light scenario can be considered to be one in which each pixel can have substantially equivalent offset and response, and each be subject to purely Gaussian temporal noise. Further, a visible departure from this situation can degrade the perceived quality of the imaging system.

In the case of offset-matching, correction while under a complete darkness scenario (e.g., lack of light exposure to clear pixels 106 of the pixel array 102, . . . ) can be difficult to effectuate with conventional techniques. Under the complete darkness scenario, random pixel noise can be minimized since there is no photon shot noise. Moreover, it can be determined empirically that for uncorrelated Gaussian noise components (e.g., with a flat spatial frequency up to the Nyquist frequency, . . . ), the amplitude of any coherent row-wise or column-wise element typically is to be less than $\frac{1}{10}^{th}$ of the random pixel noise, in order not to appreciably degrade an image.

The gain mismatch situation can differ from the offset mismatch situation. For gain mismatch, the effect of such non-ideality can be diminished in darkness and can increase linearly with the number of integrated photons. The random pixel noise when light is present can be dominated by Poisson fluctuations in the numbers of integrated photons. The magnitude of the photon shot noise can be substantially equivalent to the square root of the number of photons. Therefore, as more light is added, coherent mismatch(es) (e.g., column-wise mismatch and/or row-wise mismatch, . . . ) can become harder to hide. Thus, a sensor operating with maximum possible photo-charge (e.g., pixel full well, . . . ) can be a difficult scenario to address when attempting to mitigate gain mismatch. Therefore, in order that column-to-column gain mismatch be invisible under all circumstances for a given sensor, the column averages can have a sigma less than one-tenth of the photon shot noise at full well (e.g., as effectuated by the column mismatch mitigation component 120, . . . ).

Figure 2:
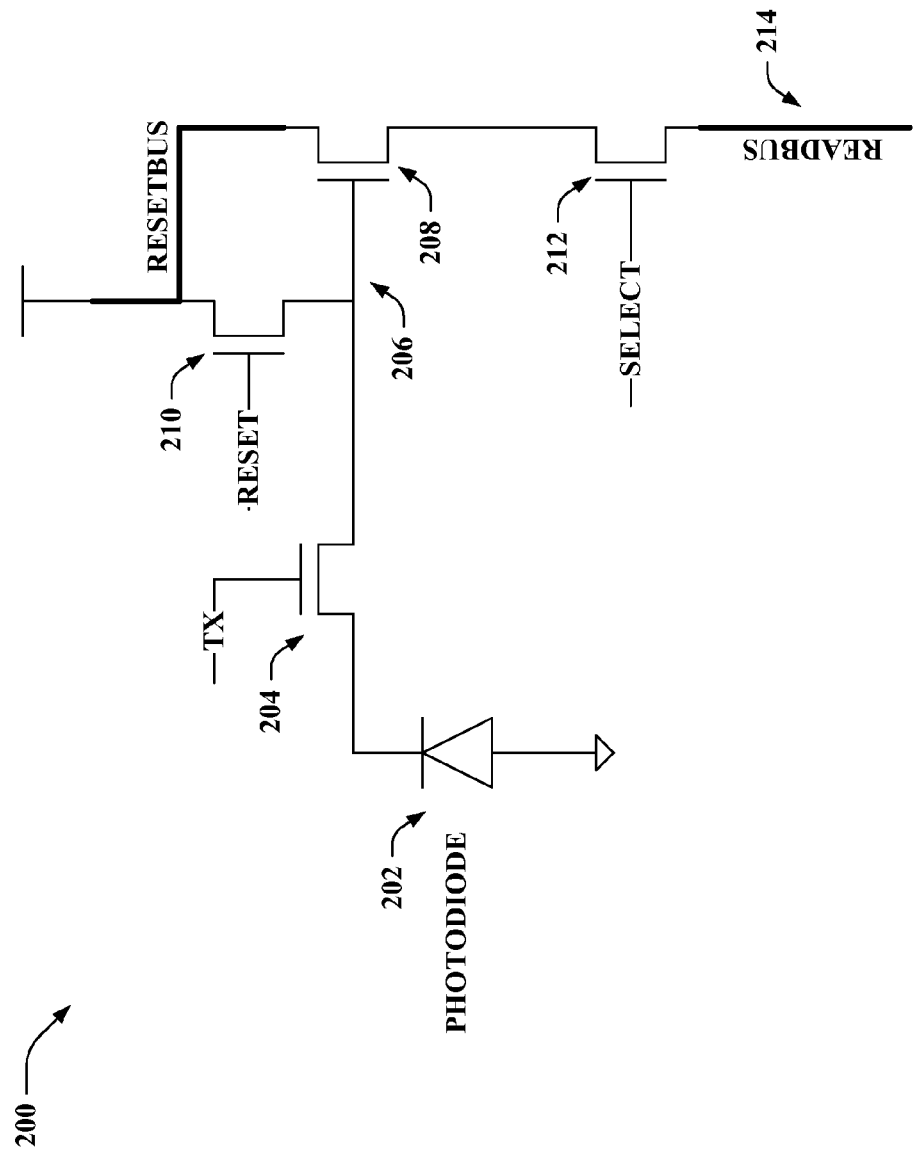
FIG. 2 illustrates an example CMOS imager pixel cell that can be included in a pixel array.

Now turning to FIG. 2, illustrated is an example CMOS imager pixel cell 200 that can be included in a pixel array (e.g., the pixel array 102 of FIG. 1). The pixel cell 200 can be a 4T pixel cell utilized in a CMOS iSoC. The pixel cell 200 includes a photodiode 202 connected to a transfer transistor 204. The transfer transistor 204 is further connected to a floating diffusion region 206. The floating diffusion region 206 connects to a source follower transistor 208 and a reset transistor 210. The source follower transistor 208 is further connected to a select transistor 212. The select transistor 212 can be employed to select a particular row of pixel cells from a pixel array.

The photodiode 202 can be charged by converting optical energy to electrical energy. For instance, the photodiode 202 can have sensitivity to a particular type of incident light (e.g., red light, blue light, green light). Moreover, the type of light to which the photodiode 202 is sensitive can indicate a type of the pixel cell 200 (e.g., R pixel, B pixel, G pixel).

According to an illustration, the floating diffusion region 206 can be reset to a known state before transfer of charge to it. Resetting of the floating diffusion region 206 can be effectuated by the reset transistor 210. Further, the transfer transistor 204 can transfer charge (e.g., yielded by the photodiode 202) to the floating diffusion region 206. The charge can be transferred based upon a transfer signal (TX) received at a gate of the transfer transistor 204. Light can be integrated at the photodiode 202 and electrons generated from the light can be transferred to the floating diffusion region 206 (e.g., in a noiseless or substantially noiseless manner) when the TX is received at the transfer transistor 204. Moreover, the pixel cell 200 (along with other pixel cell(s) in the same row of the pixel array) can be selected for readout by employing the select transistor 212. Readout can be effectuated via a read bus 214 (e.g., one of the read buses 108 of FIG. 1). Further, the source follower transistor 208 can output and/or amplify a signal representing a reset voltage (e.g., provided via a reset bus) and a pixel signal voltage based on the photo converted charges.

The CMOS imager pixel cell 200 can be a test pixel and/or a non-test pixel as described herein. A non-test pixel can operate in accordance with the above description of the CMOS imager pixel cell 200. Pursuant to an example where the CMOS imager pixel cell 200 is a test pixel, such test pixel can be sampled every frame to facilitate effectuating continuous adjustments to a correction multiplier corresponding with a column in which the pixel cell 200 is positioned within a pixel array. By way of another illustration, the test pixel can be sampled during a subset of frames to alter the correction multiplier corresponding to the column of the pixel cell 200. Sampling of the test pixel cell 200 (e.g., every frame, during a subset of frames, . . . ) allows for tracking dynamic changes to a raw column-wise gain pattern. Moreover, when the cell 200 is a test pixel, a gate of the source follower transistor 208 can be connected to a dedicated net which supplies digital to analog converter (DAC)-tunable voltages (e.g., yielded from the test signal generation component 122 of FIG. 1, . . . ). The DAC-tunable voltages can be selected to apply a test signal or a reset signal to the floating diffusion region 206, which can be readout in a manner similar to the above description for a non-test pixel.

Figure 3:
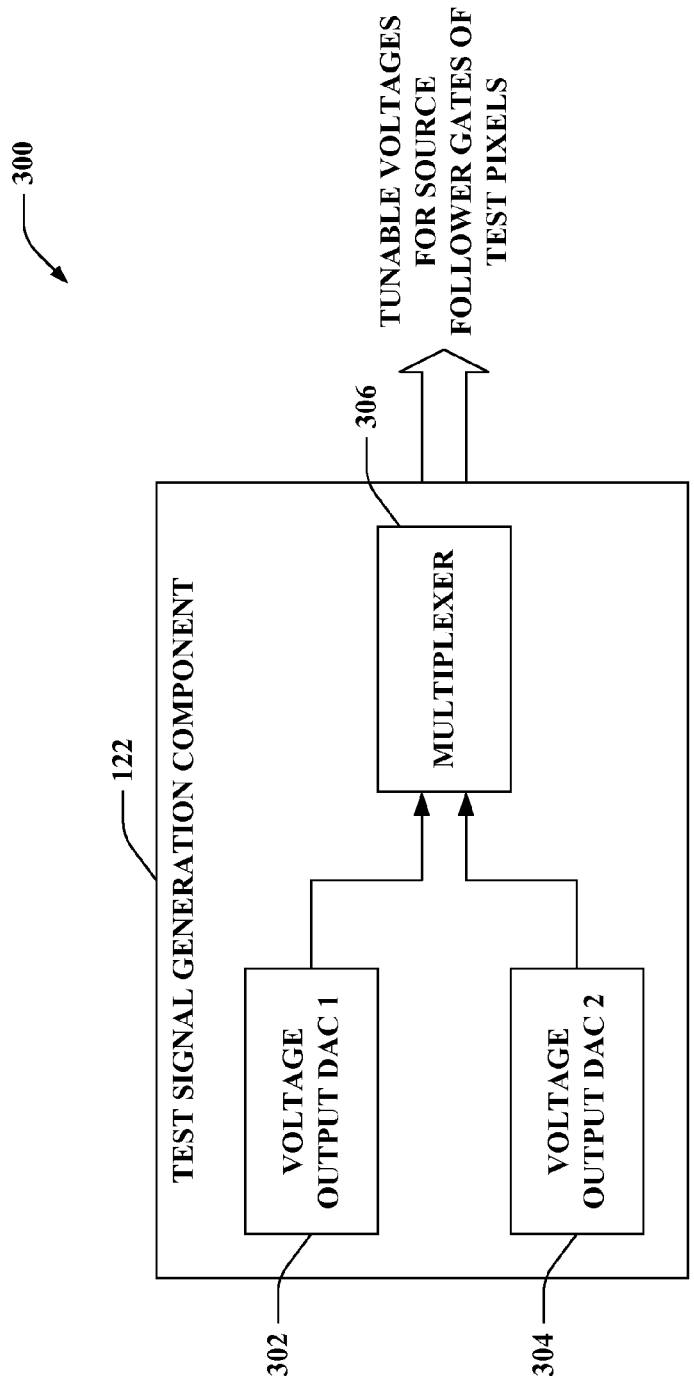
FIG. 3 illustrates an example system that generates tunable voltages for test pixels of a CMOS sensor imager.

Now referring to FIG. 3, illustrated is a system 300 that generates tunable voltages for test pixels of a CMOS sensor imager. The system 300 includes the test signal generation component 122 that yields tunable voltages for source follower gates of test pixels. The test signal generation component 122 can further include a voltage output DAC 1 302, a voltage output DAC 2 304, and a multiplexer 306. The voltage output DACs 302-304 can be tuned in order to provide a test signal to the test pixels, and inputting of the test signal to the test pixels can be expected to yield a given target (e.g., received at the column mismatch mitigation component 120 of FIG. 1, outputted from the analog readout architecture, . . . ). For instance, the voltages yielded by the voltage output DACs 302-304 can be selected to cover a dynamic range (or a large fraction thereof) of an analog to digital converter (e.g., the analog to digital converter 118 of FIG. 1, . . . ) associated with the CMOS sensor imager.

Moreover, the multiplexer 306 can be utilized to switch between providing the output voltage from the voltage output DAC 1 302 and the output voltage from the voltage output DAC 2 304, thereby mimicking reset and signal voltages which can be utilized for correlated double sampling. By way of example, the voltage output DAC 1 302 can generate a test signal and the voltage output DAC 2 304 can generate a reset signal. Following this example, the multiplexer 306 can control whether the test signal from the voltage output DAC 1 302 or the reset signal from the voltage output DAC 2 304 is supplied to test pixel(s) at a given time.

According to an example, the voltage output DACs 302-304 can be tuned by the test signal generation component 122, the column mismatch mitigation component 120 of FIG. 1, and/or the like. For instance, at a given time, the voltage output DACs 302-304 can each receive a respective digital value as a corresponding input. The respective digital values inputted to each of the voltage output DACs 302-304 can be statically defined, dynamically changing (e.g., based upon a predefined and/or adaptively determined pattern, . . . ), a combination thereof, etc. By way of another illustration, operation of the multiplexer 306 can be controlled by the test signal generation component 122, based upon a received signal from a disparate source (e.g., the column mismatch mitigation component 120 of FIG. 1, . . . ), and/or the like.

Figure 4:
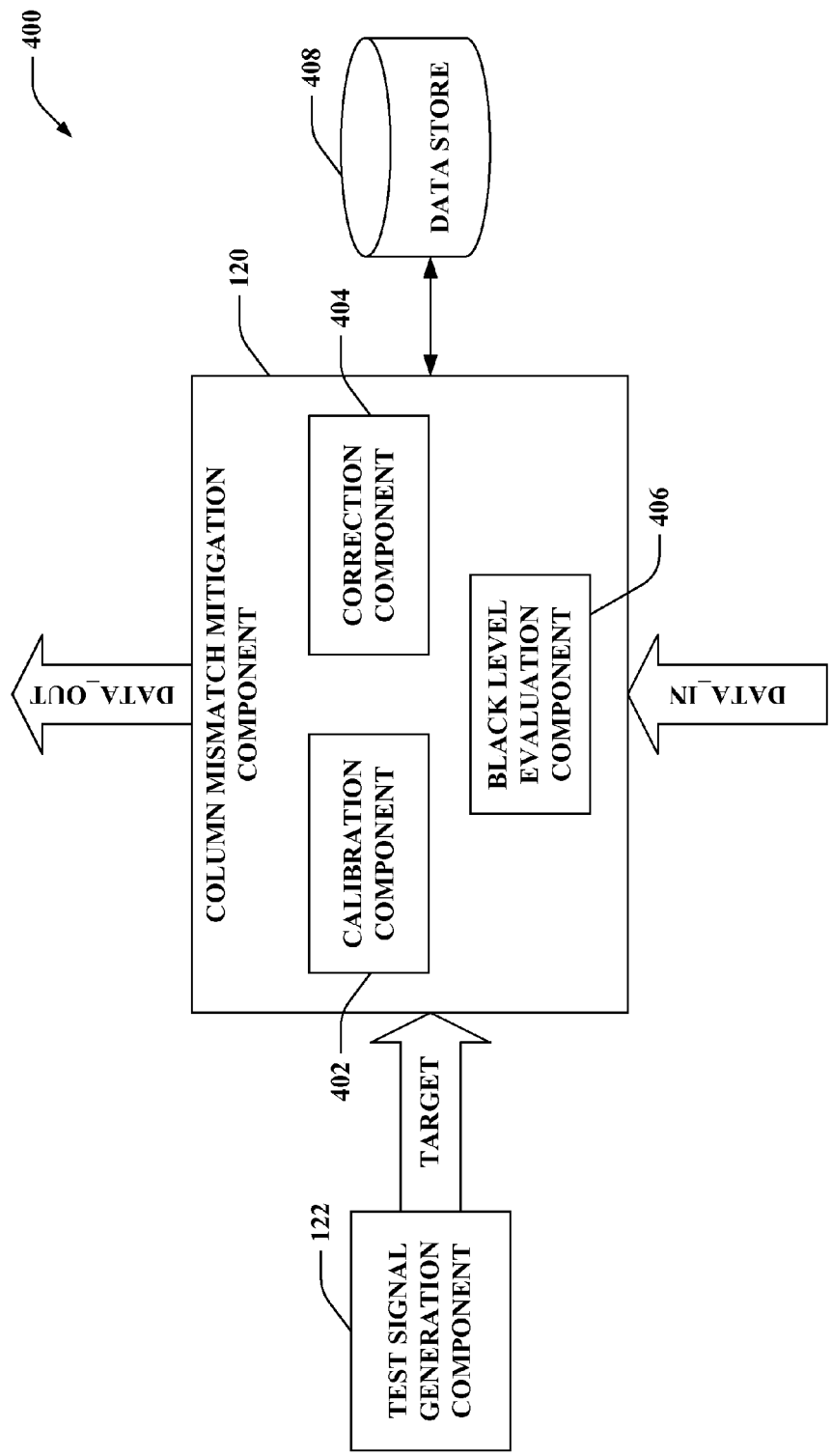
FIG. 4 illustrates an example system that calibrates and corrects column gain mismatch of a CMOS sensor imager.

Turning to FIG. 4, illustrated is a system 400 that calibrates and corrects column gain mismatch of a CMOS sensor imager. The system 400 includes the column mismatch mitigation component 120 and the test signal generation component 122 as described herein. The test signal generation component 122 can supply reset and test signals (e.g., tunable voltages, . . . ) to test pixels in a pixel array (e.g., the pixel array 102 of FIG. 1, . . . ). Moreover, the test signal generation component 122 can send an indication of a target, which is expected to be obtained in response to the test signals via the readout architecture, to the column mismatch mitigation component 120. Additionally or alternatively, the reset and test signals can be yielded by the test signal generation component 122 based upon a predefined pattern, and the column mismatch mitigation component 120 can have a priori knowledge of this predefined pattern as well as the target values corresponding thereto. According to another example, the column mismatch mitigation component 120 can control the tunable voltages yielded by the test signal generation component 122, and thus, the test signal generation component 122 need not communicate the indication of the target to the test signal generation component 122; however, it is to be appreciated that the test signal generation component 122 can send an indication of the target to the column mismatch mitigation component 120 under such scenario. Further, although shown as being separate, it is contemplated that the column mismatch mitigation component 120 can include at least a portion of the test signal generation component 122.

The column mismatch mitigation component 120 can further include a calibration component 402, a correction component 404, and a black level evaluation component 406. The column mismatch mitigation component 120 can be a logic block that resides in a digital readout path, for instance. Further, the column mismatch mitigation component 120 can distinguish between inputs from regular (e.g., non-test, . . . ) pixels and test pixels. Thus, the column mismatch mitigation component 120 can recognize input data (e.g., data_in, digitized data obtained from an ADC such as the ADC 118 of FIG. 1, . . . ) received at a given time as being from a test pixel or a regular pixel. The calibration component 402 can utilize input data from test pixels to calculate digital gain corrections (e.g., the digital gain corrections can be small, . . . ). According to an illustration, the digital gain corrections can be column-specific; however, the claimed subject matter is not so limited. Moreover, the correction component 404 can employ the digital gain corrections yielded by the calibration component 402 to align column responses when input data from regular pixels passes through the column mismatch mitigation component 120. Further, the black level evaluation component 406 can utilize optical black pixels from a pixel array to calibrate and correct for fixed pattern noise. The black level evaluation component 406 can also evaluate a black reference level that can be digitally removed from the input data to enable gain calibration and/or gain correction to be applied to a photo-signal without inclusion of the black reference level. The black reference level can further be digitally inserted upon application of gain correction to yield output data (e.g., data_out, . . . ).

Moreover, the calibration component 402 can retain the digital gain corrections in a data store 408 and the correction component 404 can retrieve the digital gain corrections from the data store 408. For instance, the data store 408 can include a digital memory element per column (e.g., of a pixel array, . . . ) that can be used to store the column-specific digital gain correction. Further, the data store 408 can retain black level related information (e.g., black reference level, fixed pattern noise correction factors, . . . ). The data store 408 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 408 of the subject systems and methods is intended to comprise, without being limited to, these and any other suitable types of memory. In addition, it is to be appreciated that the data store 408 can be a server, a database, a hard drive, and the like.

471 The column mismatch mitigation component 120 (e.g., the correction component 404, . . . ) can apply correction for a pixel from column i as follows:

data_out=[(data_in−blackref)(1+$\Delta_i$)]+blackref $\Delta_i$ is the digital gain correction for column i, and $\Delta_i$ can have the following form:

$$\Delta_i = \frac{n_i}{2^s}$$

Moreover, $n_i$ (e.g., correction value, . . . ) is a signed integer stored in memory (e.g., the data store 408, . . . ), one per column, and s is a scaling parameter that can be tuned to match an available memory dynamic (e.g., of the data store 408, . . . ) to the range of the uncorrected gain mismatch. For example, the scaling parameter can be selected by the calibration component 402 (e.g., dynamically adjusted upon evaluating gain mismatch dispersion such that improvements in dispersion can lead to returning the scaling parameter, at startup, . . . ). By way of further illustration, an optimal value of the scaling parameter can be preset; thus, the calibration component 402, the correction component 404, and/or any component of the system 400 can employ the predefined scaling parameter when storing and/or retrieving signed integers corresponding to the digital gain corrections in the data store 408. For instance, the correction component 404 can remove a black reference level from input data to yield a photo-signal, adjust the photo-signal as a function of digital gain correction corresponding to a given column from which the input data is obtained to yield a corrected photo-signal, and add the black reference level to the corrected photo-signal to generate output data.

Since the gain correction should be applied to the photo-signal, a black reference level (e.g., blackref, determined by the black level evaluation component 406, ... ) is subtracted from the input data (e.g., data_in, ... ). Such subtraction can be effectuated by the black level evaluation component 406, the correction component 404, the column mismatch mitigation component 120, etc. The blackref is equal to a number of ADC counts registered when no light is present (e.g., as determined by the black level evaluation component 406, ... ).

If the current data (e.g., data_in, ... ) is from a test pixel (e.g., as determined by the column mismatch mitigation component 120, ... ), then gain correction can be applied (e.g., by the correction component 404, ... ). The calibration component 402 can compare the resulting value to a target reference (e.g., target, ... ), which can be user adjustable. According to an example, the calibration component 402 can increment or decrement the value in memory, $n_i$, depending on whether the corrected value is above or below the target. Further, the target is tuned to match the actual mean signal (e.g., data_in−blackref, ... ) from the test pixels. Thus, this can be utilized to center the gain correction within the memory dynamic and mitigate addition of a net bias to the overall gain. Pursuant to another illustration, if signed divider logic is available, a fast convergence option can be employed by the calibration component 402, whereby a single sample can be used to make a first estimate of the correction value. This correction value can be evaluated as follows:

$$n_i = 2^s \times (\text{target}/(\text{data\_in}-\text{blackref})-1)$$

Further, the requirement that any column mismatch be masked by the photon shot noise has the result that the required memory depth can depend on two factors: the initial column mismatch present in the analog domain and the maximum photo-charge (full-well). The available memory depth can impact the quality of a gain correction. For example, a sensor with a column matching sigma of 1.0% can be simulated at a full well of 35,000e−. Moreover, different numbers of memory bits can be considered (e.g., 2 to 18, ... ). Further, the scaling parameter, s, can be scanned for each memory depth to find an optimal tune point. It can be determined that a memory depth of 6 bits can suffice according to an example; however, the claimed subject matter is not so limited.

Figure 5:
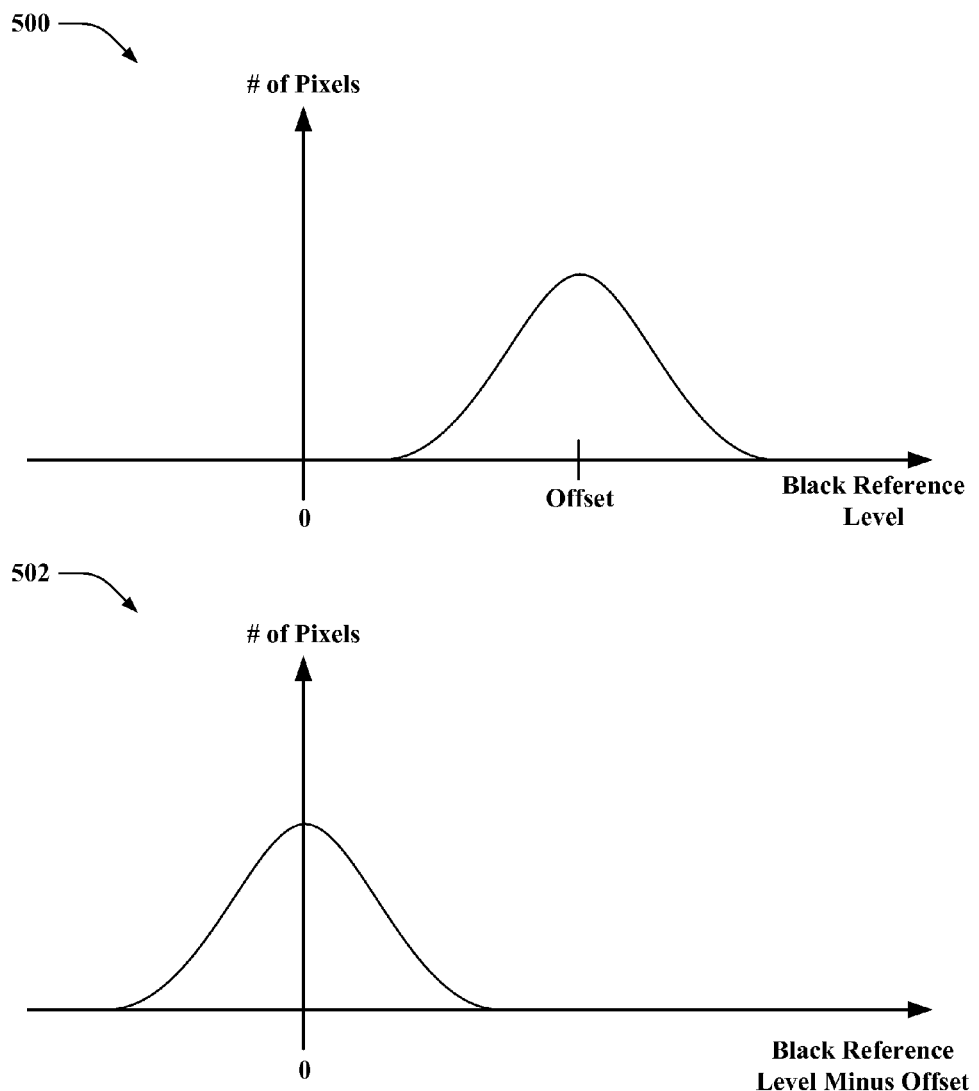
FIG. 5 illustrates example histograms depicting black reference levels of pixels for a frame.

With reference to FIG. 5, illustrated are example histograms depicting black reference levels of pixels for a frame. Graph 500 shows a histogram with black reference levels (e.g., outputs from optical black pixels with zero inputs, ... ) plotted on the x-axis versus a number of pixels that yield the respective reference levels on the y-axis. The graph 500 can have a Gaussian distribution. As shown, pixels in darkness typically do not generate a signal of zero. Rather, the mean black reference level can be offset from zero to enable accommodation of dispersion of pixels and amplification elements. Further, the overall offset can be tuned to a digital number such as 64; however, the claimed subject matter is not so limited. Thus, the mean black reference level for all pixels can be this offset value.

When gain correction is applied, the offset value can be subtracted from the black reference level as shown in a graph 502. As illustrated in the graph 502, black reference levels minus an offset are shown on the x-axis and a number of pixels with such black reference levels minus the offset are depicted on the y-axis. Accordingly, the black reference levels minus the offset can have a mean of zero. With the offset removed, gain correction can be applied. Subsequent to application of the gain correction, the offset can be added back to yield the output data.

Figure 6:
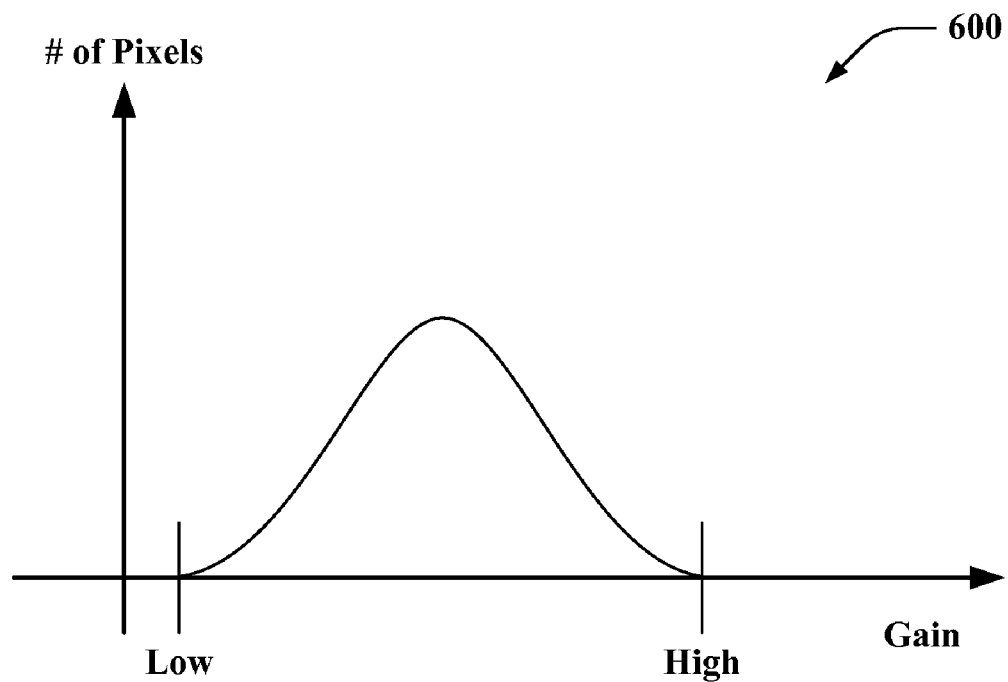
FIG. 6 illustrates an example graph showing dispersion of gains.

Turning to FIG. 6, illustrated is an example graph 600 showing dispersion of gains. The x-axis of the graph 600 depicts gain (e.g., uncorrected, ... ) while the y-axis depicts the number of pixels with such gain. Thus, the graph 600 is a histogram of the gain of every column. The memory dynamic, as described above, can be selected to cover the range of the gains (e.g., low to high, ... ) shown in the graph 600. Thus, the number of bits utilized in memory and/or the scaling parameter can be selected to account for the range of uncorrected gains.

Figure 7:
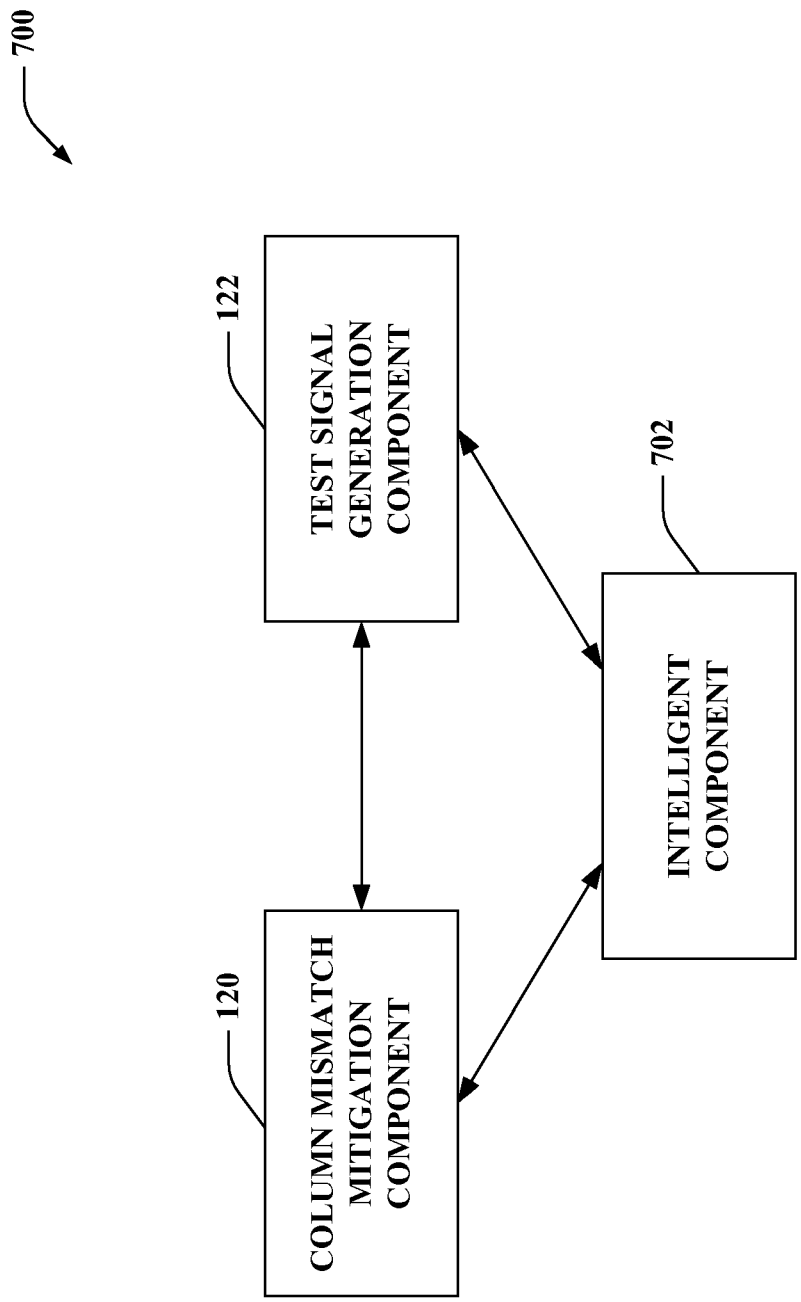
FIG. 7 illustrates an example system that compensates for column gain mismatch within a CMOS sensor imager.

Referring now to FIG. 7, illustrated is a system 700 that compensates for column gain mismatch within a CMOS sensor imager. The system 700 includes the column mismatch mitigation component 120 and the test signal generation component 122, each of which can be substantially similar to the aforementioned descriptions. The system 700 can further include an intelligent component 702.

The intelligent component 702 can be employed by the column mismatch mitigation component 120 and/or the test signal generation component 122 to reason about whether to effectuate calibration (e.g., based upon changed conditions, parameters, ... ). Pursuant to another example, the intelligent component 702 can infer gain correction values to utilize for each column.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines ... ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x) =confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 8:
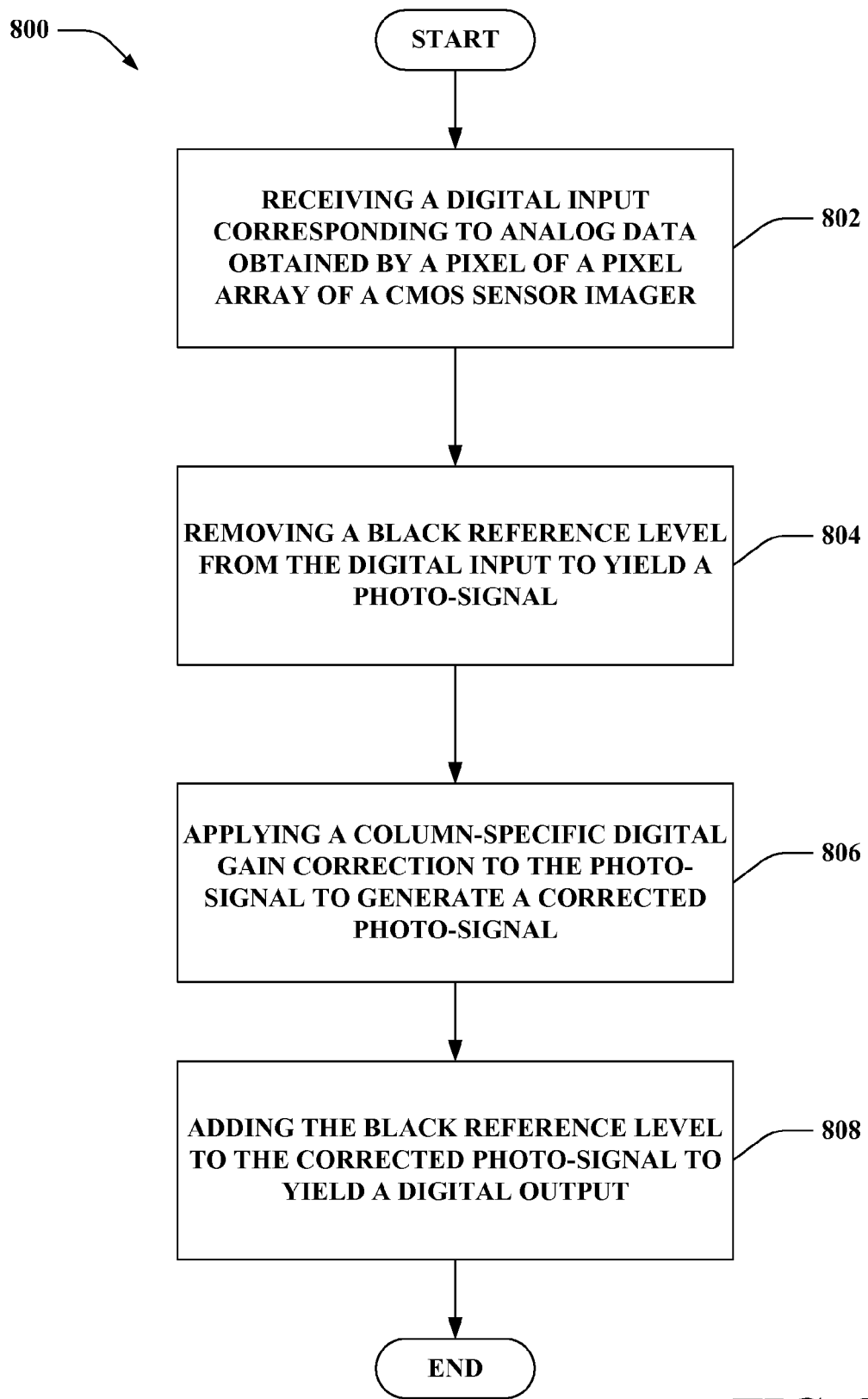
FIG. 8 illustrates an example methodology that facilitates correcting for column gain mismatch associated with a CMOS sensor imager.
Figure 9:
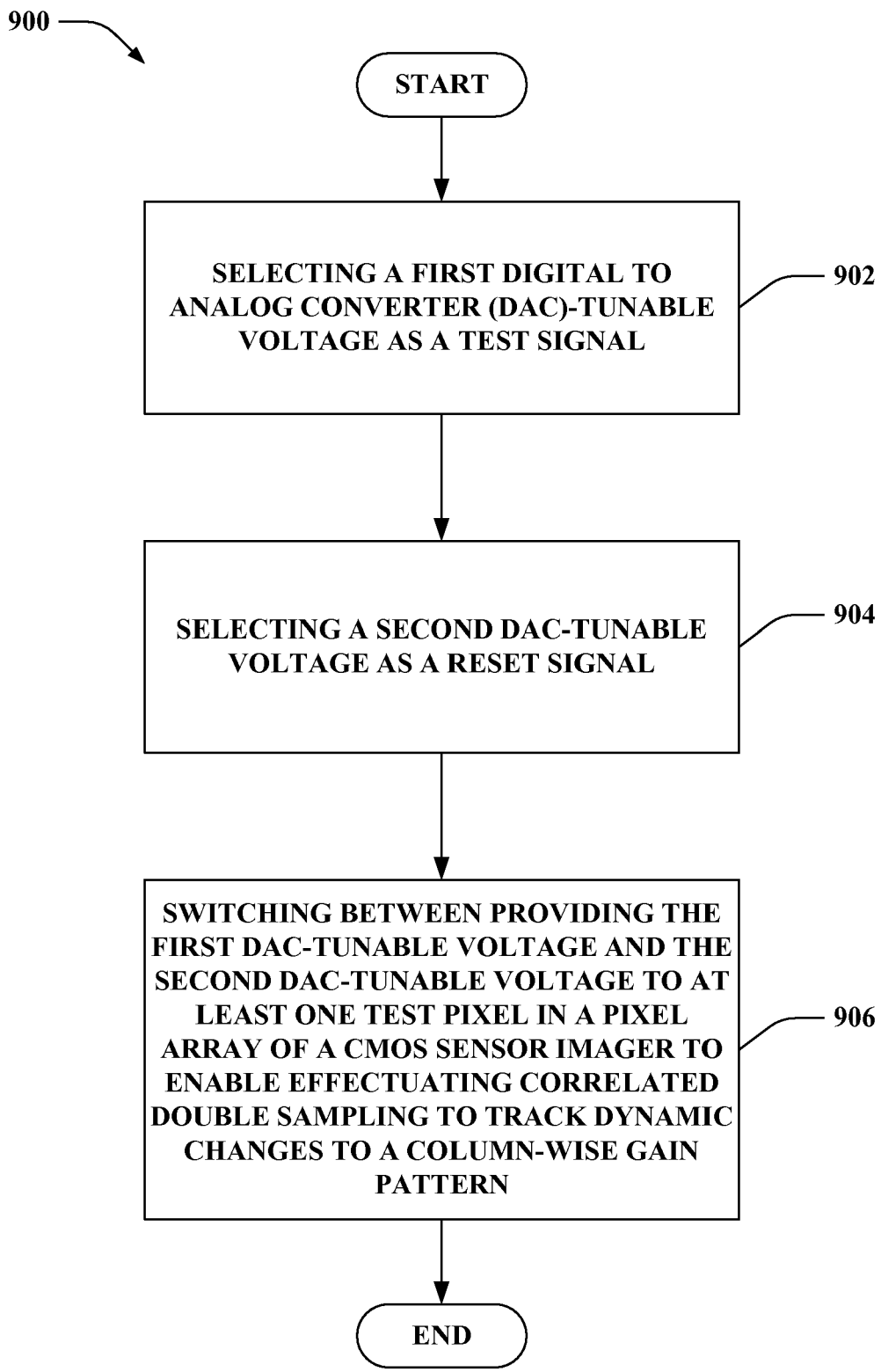
FIG. 9 illustrates an example methodology that facilitates mimicking reset and signal voltages for test pixels in a pixel array of a CMOS sensor imager.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 8, illustrated is a methodology 800 that facilitates correcting for column gain mismatch associated with a CMOS sensor imager. At 802, a digital input (e.g., data_in, . . . ) corresponding to analog data obtained by a pixel of a pixel array of a CMOS sensor imager can be received. For instance, the digital input can be yielded via digitizing an output from a column-wise analog readout architecture associated with the pixel. Moreover, the pixel can be a test pixel or a non-test pixel, where the test pixel can be utilized for calibration and the non-test pixel can be corrected. Accordingly, the digital input can be determined to originate from a test pixel or a non-test pixel. A test pixel can be supplied reset and test signals that correspond to a target, which is an expected digital output (e.g., a value of the target can be known a priori, received, derived, . . . ). Additionally or alternatively, a respective column in which the pixel corresponding to the digital input is positioned can be recognized.

At 804, a black reference level can be removed from the digital input to yield a photo-signal. The black reference level (e.g., blackref, . . . ) can be equal to a number of analog to digital converter (ADC) counts registered when no light is present. For instance, the black reference level can be calibrated utilizing optical black pixels from the pixel array. Further, the photo-signal can be equal to data_in−blackref.

At 806, a column-specific digital gain correction can be applied to the photo-signal to generate a corrected photo-signal. The corrected photo-signal can be equal to (data_in−blackref)(1+$\Delta_i$), where $\Delta_i$ is the column-specific digital gain correction. For example, the column-specific digital gain correction can be a function of a column-specific correction value, $n_i$, retained in memory and a scaling parameter, s, tuned to match an available memory dynamic to a range of uncorrected gain mismatch (e.g., $$\left(e.g., \Delta_i = \frac{n_i}{2^s}, \ldots \right).$$

The scaling parameter can be predefined, dynamically adjusted (e.g., tunable to account for changes in dispersion, . . . ), or the like. Moreover, the column-specific digital gain correction can be dynamically calibrated utilizing digital inputs corresponding to test pixels. The test pixels can be sampled every frame, during a subset of frames, etc. At 808, the black reference level can be added to the corrected photo-signal to yield a digital output. Thus, the digital output, data_out, can equal [(data_in−blackref)(1+$\Delta_i$)]+blackref. If the digital output corresponds to analog data obtained by a test pixel, then the digital output can be compared to the target for calibration of the column-specific digital gain correction. For example, the column-specific correction value retained in memory can be incremented when the digital output related to the test pixel is above the target and the column-specific correction value retained in memory can be decremented when the digital output related to the test pixel is below the target. According to another illustration, the column-specific correction value retained in memory can be directly evaluated as a function of the scaling parameter, the target, and the photo-signal (e.g., $n_i=2^s\times(\text{target}/(\text{data\_in}-\text{blackref})-1)$, . . . ).

Now turning to FIG. 9, illustrated is a methodology 900 that facilitates mimicking reset and signal voltages for test pixels in a pixel array of a CMOS sensor imager. At 902, a first digital to analog converter (DAC)-tunable voltage can be selected as a test signal. At 904, a second DAC-tunable voltage can be selected as a reset signal. According to an example, a target corresponding to the selected first and second DAC-tunable voltages can be determined, communicated to disparate logic, retrieved from memory, and so forth. By way of another illustration, selection of the first and/or second DAC-tunable voltages can be made in response to a received signal; however, the claimed subject matter is not so limited. At 906, switching can be carried out between providing the first DAC-tunable voltage and the second DAC-tunable voltage to at least one test pixel in a pixel array of a CMOS sensor imager to enable effectuating correlated double sampling to track dynamic changes to a column-wise gain pattern. The switched, DAC-tunable voltages can be supplied to a source follower gate of each of the at least one test pixel. Moreover, a digital output yielded in response to the supplied DAC-tunable voltages can be compared to the target for calibration of column-specific digital gain corrections.

Figure 10:
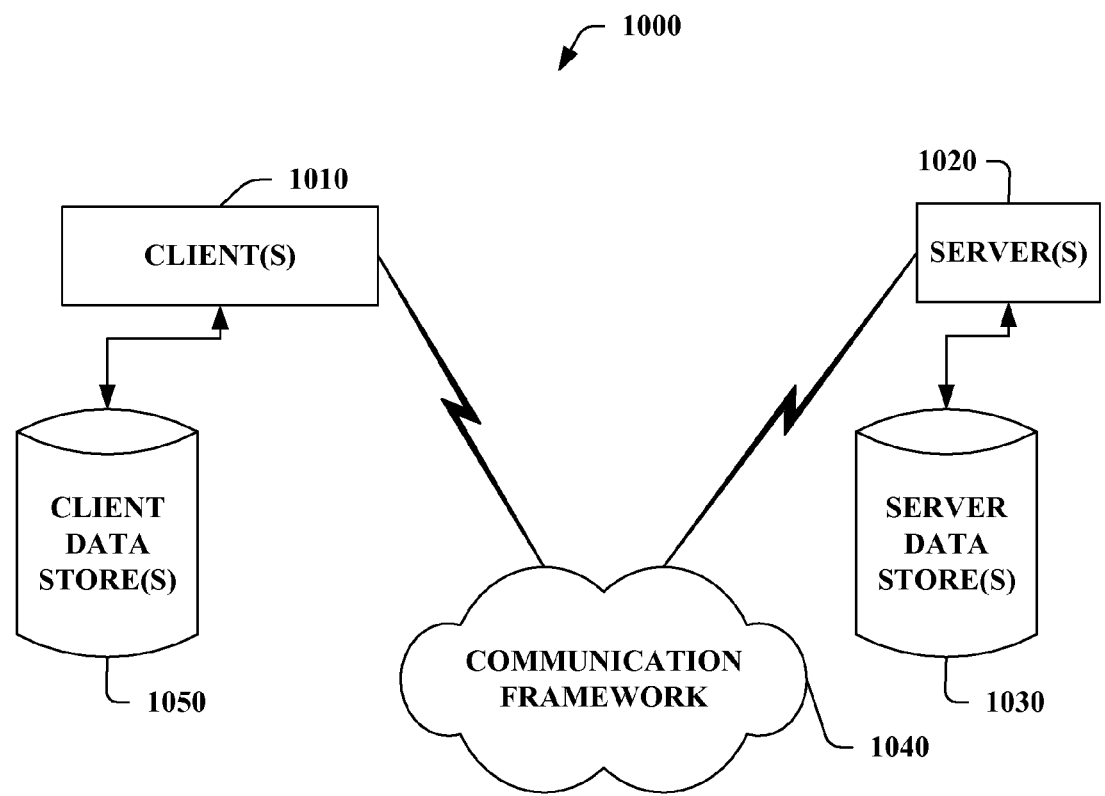
FIG. 10 illustrates an example networking environment, wherein the novel aspects of the claimed subject matter can be employed.
Figure 11:
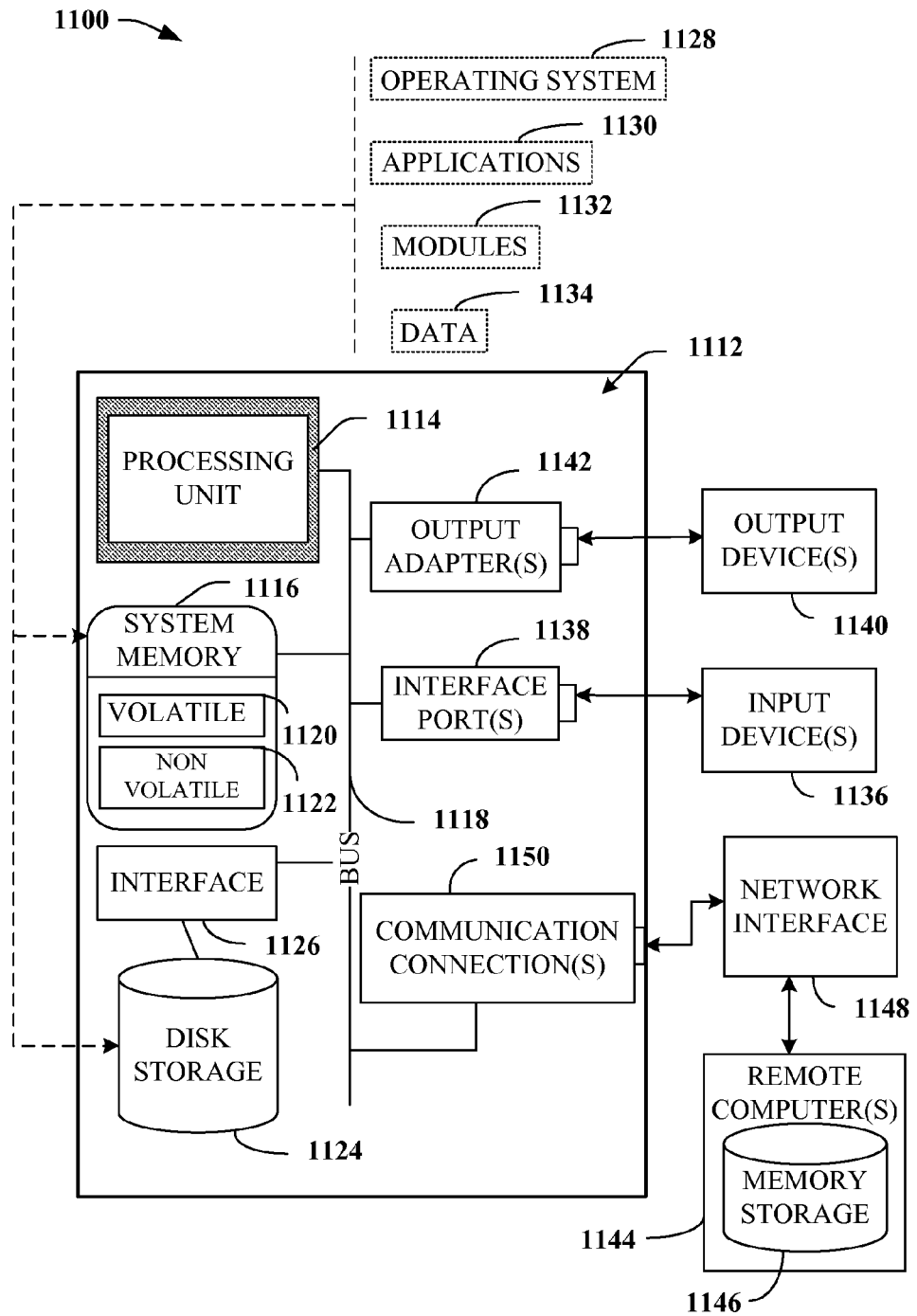
FIG. 11 illustrates an example operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For instance, FIGS. 10-11 set forth a suitable computing environment that can be employed in connection with mitigating column gain mismatch within CMOS sensor imagers. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

711 It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that employs digital column gain mismatch correction for a complementary metal-oxide-semiconductor (CMOS) imaging system-on-chip (iSoC) sensor, comprising:
    a test signal generation component that provides tunable voltages that mimic presence of photo-charge to test pixels in one or more rows of a pixel array; and
    a column mismatch mitigation component that calibrates column-specific digital gain corrections based upon digital input data obtained from the test pixels via an analog readout architecture and mitigates column gain mismatch by employing the column-specific digital gain corrections for digital input data obtained from non-test pixels via the analog readout architecture to yield digital output data, the column mismatch mitigation component retains and retrieves correction values corresponding to each column of the pixel array from a data store, the correction values are functions of the respective column-specific digital gain corrections and a common scaling parameter that is tuned to match an available memory dynamic to a range of uncorrected gain mismatch.

2. The system of claim 1, the column mismatch mitigation component further differentiates between digital input data corresponding to the test pixels and digital input data corresponding to the non-test pixels.

3. The system of claim 1, the test signal generation component further comprises:
    a first voltage output digital to analog converter (DAC) that generates a tunable test signal;
    a second voltage output DAC that generates a tunable reset signal; and
    a multiplexer that switches between providing one of the tunable test signal or the tunable reset signal to respective source followers of one or more of the test pixels at a given time.

4. The system of claim 1, the test pixels being sampled every frame to facilitate effectuating continuous adjustments to the column-specific digital gain corrections for tracking dynamic changes to a raw column-wise gain pattern.

5. The system of claim 1, the tunable voltages correspond to a target expected to be obtained via the readout architecture by the column mismatch mitigation component.

6. The system of claim 1, the column mismatch mitigation component includes a portion of the test signal generation component.

7. The system of claim 1, the column mismatch mitigation component further comprises a correction component that removes a black reference level from input data to yield a photo-signal, adjusts the photo-signal as a function of a particular column-specific digital gain correction from the column-specific digital gain corrections to yield a corrected photo-signal, where the particular column-specific digital gain correction corresponds to a column from which the input data is obtained, and adds the black reference level to the corrected photo-signal to generate output data.

8. The system of claim 7, the column mismatch mitigation component further comprises a black level evaluation component that determines the black reference level as being a number of analog to digital converter (ADC) counts registered when no light is present.

9. The system of claim 8, the black level evaluation component further utilizes optical black pixels from the pixel array to calibrate and correct for fixed pattern noise.

10. The system of claim 7, the column mismatch mitigation component further comprises a calibration component that compares the generated output data to a target expected to be obtained via the readout architecture when the input data is from a test pixel and alters the particular column-specific digital gain correction based upon the comparison.

11. The system of claim 10, the calibration component increments a correction value corresponding to the particular column-specific digital gain correction when the generated output data is above the target and decrements the correction value when the generated output is below the target.

12. The system of claim 10, the calibration component utilizes a single sample to converge to a correction value corresponding to the particular column-specific digital gain correction based upon a scaling parameter, the target, and the photo-signal.

13. A method that facilitates correcting for column gain mismatch associated with a CMOS sensor imager, comprising:
    receiving a digital input corresponding to analog data obtained by a pixel of a pixel array of a CMOS sensor imager;

removing a black reference level from the digital input to yield a photo-signal;

applying a column-specific digital gain correction to the photo-signal to generate a corrected photo-signal, the column-specific digital gain correction being a function of a column-specific correction value retained in memory and a scaling parameter tuned to match an available memory dynamic to a range of uncorrected gain mismatch; and adding the black reference level to the corrected photo-signal to yield a digital output.

14. The method of claim 13, further comprising yielding the digital input via digitizing an output from a column-wise analog readout architecture associated with the pixel.

15. The method of claim 13, further comprising determining whether the digital input originated from a test pixel supplied reset and test signals that correspond to a target or a non-test pixel exposed to optical energy.

16. The method of claim 13, further comprising dynamically adjusting the scaling parameter to account for changes in gain dispersion.

17. The method of claim 13, further comprising comparing the digital output to the target for calibration of the column-specific digital gain correction when the digital output corresponds to analog data obtained by a test pixel.

18. The method of claim 13, further comprising:

selecting a first digital to analog converter (DAC)-tunable voltage as a test signal;

selecting a second DAC-tunable voltage as a reset signal; and switching between providing the first DAC-tunable voltage and the second DAC-tunable voltage to at least one test pixel in the pixel array to enable effectuating correlated double sampling to track dynamic changes to a column-wise gain pattern.

19. A system that enables calibrating for column gain mismatch in a CMOS sensor imager, comprising:

means for providing tunable voltages to test pixels in one or more rows of a pixel array;

means for calibrating column-specific digital gain corrections based upon digital input data obtained from the test pixels via an analog readout architecture, the column-specific digital gain correction being a function of a column-specific correction value retained in memory and a scaling parameter tuned to match an available memory dynamic to a range of uncorrected gain mismatch; and means for mitigating column gain mismatch by employing the column-specific digital gain corrections for digital input data obtained from non-test pixels via the analog readout architecture.

20. The system of claim 19, further comprising means for differentiating between digital input data corresponding to the test pixels and digital input data corresponding to the non-test pixels.

* * * * *